United States Patent [19]

Kuwabara et al.

[11] Patent Number: 5,309,254
[45] Date of Patent: May 3, 1994

[54] IMAGE PROCESSING APPARATUS CAPABLE OF PROCESSING HALFTONE IMAGE DATA

[75] Inventors: Nobuaki Kuwabara; Takahisa Endou, both of Tokyo; Yasunobu Suzuki, Tokorozawa, all of Japan

[73] Assignee: Casio Computer Co., Ltd., Tokyo, Japan

[21] Appl. No.: 102,108

[22] Filed: Aug. 4, 1993

Related U.S. Application Data

[63] Continuation of Ser. No. 655,661, Feb. 14, 1991, abandoned.

[30] Foreign Application Priority Data

Feb. 27, 1990 [JP] Japan .................................. 2-44348

[51] Int. Cl.$^5$ .............................................. H04N 1/40
[52] U.S. Cl. ..................... 358/456; 358/455; 358/462; 358/466; 382/50
[58] Field of Search ............... 358/455, 462, 466, 456, 358/50

[56] References Cited

U.S. PATENT DOCUMENTS

| | | | |
|---|---|---|---|
| 3,294,896 | 12/1966 | Young, Jr. ............................ | 358/466 |
| 4,554,593 | 11/1985 | Fox et al. ............................. | 358/455 |
| 4,559,563 | 12/1985 | Joiner, Jr. ............................ | 358/429 |
| 4,668,995 | 5/1987 | Chen et al. ........................... | 358/462 |
| 5,034,990 | 7/1991 | Klees .................................... | 358/462 |

*Primary Examiner*—Edward L. Coles, Sr.
*Assistant Examiner*—Thomas L. Stoll
*Attorney, Agent, or Firm*—Frishauf, Holtz, Goodman & Woodward

[57] ABSTRACT

When image data having a halftone is binary-coded, each of pixel data is first read out as gradation data having multiple values, a judgement is made whether or this pixel data corresponds to a value within a predetermined range, and if this pixel data is present within this range, a halftone processing operation is carried out by way of the error diffusion method. On the other hand, if another judgement is made that the pixel data is out of this predetermined range, this pixel is simply binary-coded. Thus, a portion where characters have been written is not processed by the halftone processing operation by way of the error diffusion method, whereby a clear image may be reproduced.

2 Claims, 2 Drawing Sheets

IMAGE PROCESSING APPARATUS CAPABLE OF PROCESSING HALFTONE IMAGE DATA

This application is a continuation of U.S. application Ser. No. 07/655,661, filed Feb. 14, 1991, now abandoned.

BACKGROUND OF THE INVENTION

1. Field of the Invention

The present invention generally relates to an image processing apparatus used in a facsimile machine and the like. More specifically, the present invention is directed to an image processing apparatus capable of improving a halftone image process.

2. Related Art of the Invention

When an original such as a photograph having a halftone is transmitted via the conventional facsimile machines, since the image thereof reproduced at the receiver side is represented only by white pixels and black pixels, white portions and black portions of this image are excessively strengthened and thus, the image qualities thereof are considerably lowered. To avoid such a conventional drawback, very recently, there have been developed such image processing apparatuses in which each pixel data read out from an original is constructed of plural bits and has plural gradations, whereby a halftone of the image is reproduced by these pixel data in order to extensively improve an image quality.

In general, on the other hand, the halftone is printed by the printer, which requires complex circuits and controls. Accordingly, to reproduce the pixel data having such gradations by these halftones, certain pixel data having these gradations is converted into data having a binary level in accordance with a predetermined process, so that these halftones are suspectedly represented.

It should be understood that the error diffusion method has been widely known as the above-described predetermined process for converting the pixel data having the gradations into the data having the binary data. Briefly speaking, as represented in FIG. 3, this error diffusion method is understood as follows. Assuming now that pixel data for two lines which had been acquired by reading an image have been stored in a memory, pixel data "x" (data on a position indicated by a black point) with respect to a coordinate (i, j) of data is to be considered. With respect to pixel data on the respective coordinates (i, j+1); (i+1, j−1); (i+1, j) and (i+1, J+1) around this pixel data "x", diffusion coefficients $a_0$, $a_1$, $a_2$ and $a_3$ are given. It should be noted in this case that in the pixel data, the gradations of 0 to 255 are represented by 8 bits, and also the gradation of "0" indicates black, whereas the gradation of "255" represents white.

Then, a judgement is first made whether the data "x" is greater than "128" corresponding to the intermediate value between white and black. If it is judged that the data "x" is greater than "128", then this data "x" is regarded as "255" (white). Conversely, if it is judged that the data "x" is smaller than "128", then this data "x" is regarded as "0"(black). Then, the data "x" is binary-coded. Furthermore, in case that a judgement is made that the data "x" is greater than "128", the error diffusion process is carried out with respect to the data of the respective coordinates based upon the following equation:

$$(x-255) \times (an/x) + y = Y \quad (1)$$

Conversely, if another judgement is made that the data "x" is smaller than "128", the data of the respective coordinates based upon the following equation is obtained:

$$(x-0) \times (an/s) + y = Y \quad (2)$$

where symbol "an" indicates a diffusion coefficient given to each of the data on these coordinates; symbol "s" denotes a summation of the respective diffusion coefficients; symbol "y" represents a pixel data value of each of the coordinates; and symbol "Y" is a data value which is again stored in the respective coordinates after the calculations.

Accordingly, for instance, in case that the following diffusion coefficients are given; $a_0=7$; $a_1=3$, $a_2=5$; and $a_3=1$, assuming that the pixel "x" is equal to "200", this pixel "x" becomes a white pixel by way of the error diffusion process, and another pixel positioned on the coordinate neighbor (i, j+1) of the data "x" is added by:

$$[200(x)-255] \times [7(a_0)/16(s)] \approx -24.$$

Similar process operations will be executed for other peripheral pixels.

As previously explained, in accordance with such an error diffusion method, a comparison is made between the pixel data and the reference value "128", whereby the pixel data is substituted by either "0" or "255" and then binary-coded, and furthermore the difference in the value of "x" is diffused around the coordinates (i, j+1); (i+1, j−1); (i+1, j) and (i+1, j+1), with the respective weights and then new data values of peripheral data may be obtained. That is to say, the error occurring in the data "x" and reference value "128" is distributed to the peripheral pixels. Such a process operation is performed with respect to all of these data for each line, and thus each of the data is binary-coded with the value containing the diffusion error, so that the halftone image having the density gradation analogous to the original image is obtained.

In accordance with the error diffusion method, since the binary coding operation involving these accumulated errors is carried out, and the errors caused by comparing the binary-coded values and the original pixel values are diffused toward the pixels which have not yet been processed and are positioned around the relevant pixel, there are some possibilities that the portions which should be originally represented in either black or white gradation, are not indicated by either black or white gradation by reason of the error diffusion, depending upon the accumulated errors and also the peripheral conditions of the pixel. As a consequence, there are drawbacks that the reproduced character data may have bad image qualities because some pixels are dropped out from the reproduced shape of characters.

SUMMARY OF THE INVENTION

An object of the present invention is to provide an image processing apparatus such that in processing an image with a halftone, even if the image has an image portion where black and white parts are clearly distinguishable, i.e., a character, or a halftone image portion, excellent image reproduction may be achieved.

According to the present invention, an image processing apparatus comprises:
  image signal producing means for outputting each of pixel data constituting an image as gradation data having a predetermined bit number;
  simple binary-coding means for converting the gradation data outputted by the image signal producing means into either white data or black data;
  halftone processing means for halftone-processing the gradation data outputted by the image signal producing means;
  judging means for judging whether or not the gradation data outputted by the image signal producing means is present within a predetermined range; and,
  selecting means for selecting the halftone processing means when the judging means judges that the gradation data is present in said predetermined range, and for selecting the simple binary-coding means when the judging means judges that the gradation data is present out of said predetermined range.

DETAILED DESCRIPTION OF THE PREFERRED EMBODIMENTS

Arrangement of Image Processing Apparatus

Figure 1:
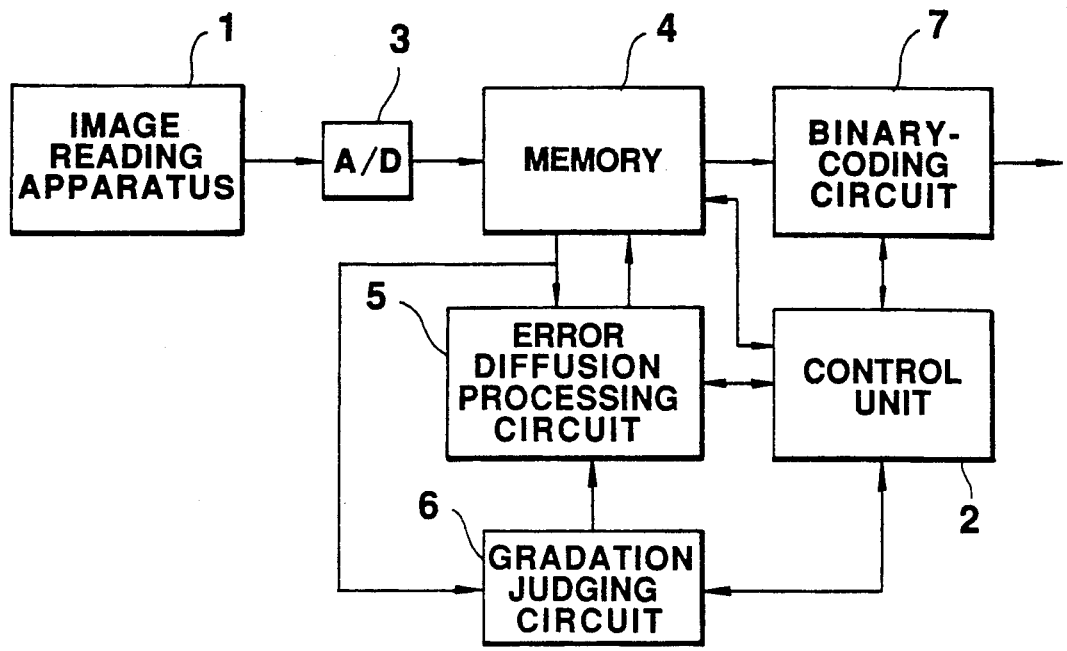
FIG. 1 is a schematic block diagram of an image processing apparatus according to a preferred embodiment of the present invention.
Figure 3:
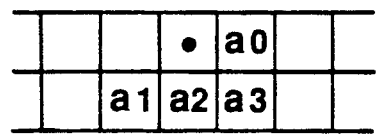

FIG. 1 represents a circuit arrangement of an image processing apparatus according to a preferred embodiment of the present invention. In FIG. 1, reference numeral 1 indicates an image reading apparatus. The image reading apparatus 1 includes a 1-line image sensor, and reads an original every 1 line thereof in response to an instruction from a control unit 2 so as to output pixel data as analog signals in accordance with the gradation thereof. The output signal of this image reading apparatus 1 is sent to an A/D converter 3 in order to be converted into a digital signal. In this case, the A/D converter 3 outputs image data having multiple values of 0 to 255, i.e., 8 bits with respect to one pixel.

The output from the A/D converter 3 is supplied to a memory 4. The memory 4 stores one pixel as 1 byte therein, and can store at least the pixel data consisting of 2 lines. In this case, data writing/reading operations of the memory 4 are executed under control of the control unit 2.

The pixel data of the memory 4 is sent to an error diffusion processing circuit 5. The error diffusion processing circuit 5 performs a data processing operation based on the above-described error diffusion processing method. The data which has been processed by the error diffusion processing circuit 5 is stored into the memory 4. In this case, the process operation executed in this error diffusion processing unit 5 is carried out while acquiring the data of the memory 4 with respect to two lines. The pixel data from the memory 4 is also supplied to a gradation judging circuit 6.

The functions of this gradation judging circuit 6 are to judge whether or not the image data is greater than or equal to the reference value "128", and also to judge whether or not the image data is within the halftone range, and furthermore to furnish the judgement results to the control unit 2. In this preferred embodiment, for instance, when the gradation data of the pixel data is in a range greater than or equal to the reference value "252", this data is regarded as "white". When the pixel data is in a range smaller than or equal to "3", this data is regarded as "black". Also, it may be judged that the pixel data which is regarded as neither black nor white is not in the halftone range.

A binary-coding process unit 7 is employed so as to convert the data which has been processed in the error diffusion processing unit 5, into black (1) or white (0).

Image Data Processing

Figure 2:
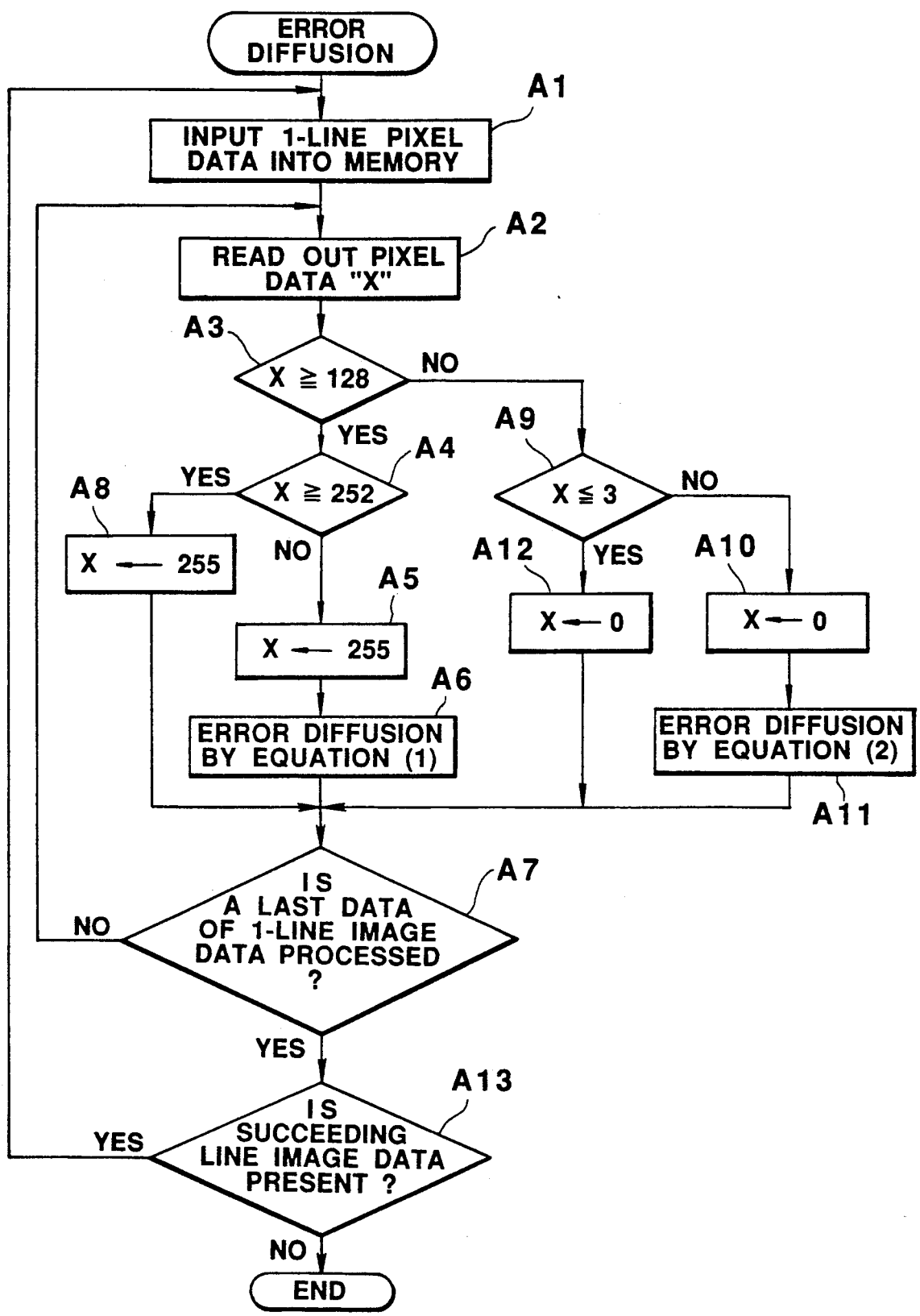
FIG. 2 is a flowchart for explaining operations of the image processing apparatus shown in FIG. 1; and, FIG. 3 is an illustration for explaining the error diffusion method.

The image data processing operation by the image processing apparatus with the above-described arrangement will now be explained with reference to the flowchart shown in FIG. 2.

Assuming now that the analog signal corresponding to each pixel of 1 line is outputted from the image reading apparatus 1 and then supplied to the A/D converter 3, this analog signal is converted into image data having multiple values of "0" to "255" consisting of 8 bits by the A/D converter 3 with respect to 1 pixel of these analog signals, and the resultant digital data is written into the memory 4 at a step A1.

Subsequently, the process is advanced to a next step A2 at which 1 pixel of the preceding line written into the memory 4 is read out as pixel data "x" in question. Then, a judgement is made by the gradation judging circuit 6 whether or not the pixel data "x" is greater than, or equal to "128" at a step A3. If a judgement is made that the pixel data is greater than or equal to "128", the process is advanced to a subsequent step A4. At this step A4, another judgement is made by the gradation judging circuit 6 whether or not the pixel data "x" is greater than, or equal to "252". Now, if the pixel data "x" is within a range defined by "128" $\leq x <$ "252", i.e., "NO", it is judged that the pixel data "x" is within the halftone range. Thus, the process is advanced to a step A5 in which the pixel data "x" is regarded as "white" and therefore converted into "255". Next, the process is advanced to a step A6 at which the error diffusion processing operation is executed based upon the above-described equation (1), and a difference value between the actual value of the pixel data "x" and "255" is distributed to the pixels around this pixel data "x".

Subsequently, the process is advanced to a next step A7 at which a judgement is made whether or not the last image data of 1 line has been processed. If a judgement result is made "NO", the process is returned to the previous step A2 at which next pixel data "x" on the same line is read out. Then, the operations as defined after the above-explained step A3 will be repeatedly performed.

Then, if it is judged that the pixel data "x" in question is greater than, or equal to "252" which is close to "white", in other words, in case that the pixel data "x" may be regarded as the white gradation, the process is advanced to a step A8. At this step A8, the pixel data "x" is converted into "255", no error diffusion process is performed, and then the process is advanced to the step A7.

On the other hand, if a judgement is made that the image data "x" is smaller than "128", the process is advanced to a step A9. At this step A9, it is judged whether or not the pixel data "x" is smaller than, or equal to "3" by the gradation judging circuit 6. Here, if the pixel data "x" is without a range as defined by "0≦X≦"3", and a judgement result becomes "NO", a judgement is made that the pixel data "x" is within the halftone range. Accordingly, the process is advanced to a step A10, at which the pixel data "x" is converted into "0". Next, the process is advanced to a further step A11 at which the error diffusion processing operation is executed based on the above-described equation (2). Subsequently, the process is advanced to step A7.

Furthermore, in case that a judgement is established that the pixel data "x" in question is smaller than, or equal to "3" which is close to black at the step A9, in other words, when the pixel data in question may be regarded as the black gradation, the process is advanced to a step A12. At this step A12, the pixel data "x" is converted into "0", no error diffusion processing operation is carried out, and then the process is advanced to the step A7.

The above-explained operations as defined in these steps are repeatedly executed until 1-line image data has been completely processed at the step A7, while sequentially reading the pixel data "x" at the same line.

Then, when the 1-line image data have been processed and a judgement result of the step A7 is made "YES", the process is advanced to a step A13, at which another judgement is made whether or not image data on the succeeding line is stored. If there is the succeeding image data, i.e., "YES", the process is returned to the previous step A1. At this step A1, image data of the next 1 line, having multiple values, is written into the memory 4, and thus, the process operations as defined after the above-described step A3 are repeatedly executed.

As previously stated, the data which has been substituted by "0" or "255" is sent in units of 1 line into the binary-coding process unit 7 so as to be converted into black (1) or white (0), whereby the binary-coded image data is outputted therefrom.

As a consequence, in accordance with the present invention, when the pixel data in question is judged to be greater than "252" close to white, this pixel data may be regarded as the white gradation. Thus, the error diffusion processing operation may be omitted by only converting the pixel data "x" into "255". On the other hand, if another judgement is made that the pixel data "x" is smaller than 3 close to black, this pixel data may be regarded as the black gradation, and the error diffusion processing operation may be omitted by only converting the pixel data into "0". As a consequence, it is possible to prevent such a drawback that a portion such as character portions which should be originally represented by black or white, is not indicated by either black or white gradation due to the error diffusion. Accordingly, the pixel dropping out phenomenon about characters caused by this drawback may be avoided, and then the image having natural tones with better image qualities may be reproduced.

It should be noted that the present invention is not limited to the above-described preferred embodiments, but may be modified without departing from the technical spirit and scope of the present invention.

What is claimed is:

1. Am image processing apparatus, in which an image is represented by pixels disposed in a matrix arrangement, comprising:

image signal producing means for outputting gradation data for each pixel corresponding to an originally input pixel value thereof, each gradation data having a bit number falling within a range of from a value WO to a value BO, the value WO corresponding to a white color on the image and the value BO corresponding to a black color on the image;

storage means for storing the gradation data output from said image signal producing means, the gradation data corresponding to pixels which are disposed in at least two rows of the matrix arrangement;

reading means for successively reading out gradation data corresponding to one pixel by one pixel from said storage means;

judging means for judging whether the gradation data received from said reading means and corresponding to each pixel is larger than a predetermined value Q1, whether the gradation data falls within a range of from the predetermined value W1 to another predetermined value B1, or whether the gradation data is smaller than said another predetermined value B1, the predetermined value W1 being larger than said another predetermined value B1 and being smaller than said value WO, said another predetermined value B1 being larger than said value BO and being smaller than said predetermined value W1;

first processing means for performing an error diffusion process on the gradation data received from said reading means and corresponding to each pixel to replace the relevant gradation data of the storage means with the value WO or the value BO depending on the result of the error diffusion process, with such error diffusion process being performed only when said judging means determines that the gradation data falls within the range of from the predetermined value W1 to said another predetermined value B1;

second processing means for replacing the relevant gradation data of said storage means with the value WO when said judging means determines that the gradation data read out by said reading means is larger than said predetermined value W1;

third processing means for replacing the relevant gradation data of said storage means to the value BO when said judging means determines that the gradation data read out by said reading means is smaller than said another predetermined value B1; and binary coding means for converting the value WO of said storage means into white data and for converting the value BO of said storage means into black data.

2. In a system including an image signal producing means for outputting pixel data of pixels as gradation data, and wherein an image is represented by pixels, each gradation data having a bit number falling within a range of from a value WO to a value BO, the value WO corresponding to a white color on the image and the value BO corresponding to black color on the image, and storage means for storing the gradation data output from said image signal producing means, the gradation data corresponding to pixels which are disposed in at least two rows of the matrix arrangement, an image processing method for converting the gradation data stored in said storage means into binary data comprising the steps of:

(a) successively reading out the gradation data corresponding to said one by one pixel from said storage means;

(b) judging whether the gradation data read at the step (a) is larger than a predetermined value W1, whether the gradation data falls within a range from of the predetermined value W1 to another predetermined value B1, or whether the gradation data is smaller than said another predetermined value B1, said predetermined value W1 being larger than said another predetermined value B1 and being smaller than the value WO, said another predetermined value B1 being larger than the value BO and being smaller than said predetermined value W1;

(c) performing an error diffusion process on the gradation data read at the step (a) to replace the relevant gradation data of said storage means with the value WO or the value BO depending on the result of the error diffusion process, only when it is determined at the step (b) that the gradation data falls within the range of from said predetermined value W1 to said another predetermined value B1;

(d) replacing the relevant gradation data of said storage means with the value WO when it is determined at the step (b) that the gradation data read out at the step (a) is larger than said predetermined value W1;

(e) replacing the relevant gradation data of said storage means to the value BO when it is determined at the step (b) that the gradation data is smaller than said another predetermined value B1; and (f) converting the value WO of said storage means into white data and converting the value BO of said storage means into black data, respectively.

* * * * *

UNITED STATES PATENT AND TRADEMARK OFFICE
CERTIFICATE OF CORRECTION

PATENT NO. : 5,309,254
DATED : May 3, 1994
INVENTOR(S) : KUWABARA et al.

It is certified that error appears in the above-indentified patent and that said Letters Patent is hereby corrected as shown below:

Column 6, line 23, "Q1" should be --W1--

Signed and Sealed this

Twenty-sixth Day of August, 1997

Attest:

BRUCE LEHMAN

Attesting Officer

Commissioner of Patents and Trademarks